United States Patent [19]
Quin

[11] Patent Number: 5,273,422
[45] Date of Patent: Dec. 28, 1993

[54] TRIMMING APPARATUS

[75] Inventor: Willoughby M. Quin, New Haven, Conn.

[73] Assignee: The Plastic Forming Company, Inc., Woodbridge, Conn.

[21] Appl. No.: 956,153

[22] Filed: Oct. 5, 1992

[51] Int. Cl.$^5$ .................. B29C 37/02; B29C 49/72
[52] U.S. Cl. .................. 425/527; 425/289; 425/806; 264/80; 264/161
[58] Field of Search .................. 264/161, 80, 162; 425/289, 459, 806, 806 R, 263-268, 527, 531, 553

[56] References Cited

U.S. PATENT DOCUMENTS

| | | | |
|---|---|---|---|
| 2,670,645 | 3/1954 | Pipper et al. | 425/268 |
| 3,055,047 | 9/1962 | Preissler | 425/459 |
| 3,702,789 | 11/1972 | Dungan | 264/80 |
| 4,279,584 | 7/1981 | Hawrylo | 264/161 |
| 4,518,551 | 5/1985 | Lin | 264/161 |
| 4,535,223 | 8/1985 | Westerman, Jr. | 425/810 |
| 4,535,224 | 8/1985 | Westerman, Jr. | 425/810 |
| 4,549,066 | 10/1985 | Piccioli et al. | 425/806 |
| 4,894,958 | 1/1990 | Takasaki | 264/161 |

FOREIGN PATENT DOCUMENTS

| | | | |
|---|---|---|---|
| 2504447 | 10/1982 | France | 264/80 |
| 2526263 | 12/1976 | United Kingdom | 264/161 |

Primary Examiner—Jay H. Woo
Assistant Examiner—Duane S. Smith
Attorney, Agent, or Firm—Bachman & LaPointe

[57] ABSTRACT

A trimming apparatus for trimming blow molded plastic workpieces includes a torch for heat trimming the workpiece; a turntable for supporting the workpiece, rotatably mounted relative to the torch; and a cam for guiding the torch, the cam cooperating the turntable with the torch so that the torch follows a contour of the workpiece when the turntable is rotated relative to the torch. The cam is preferably disposed on the turntable and in registry with the workpiece, and has a contour selected according to the contour of a surface of the workpiece to be trimmed so as to properly position the torch relative to the surface of the workpiece to be trimmed.

15 Claims, 3 Drawing Sheets

TRIMMING APPARATUS

BACKGROUND OF THE INVENTION

1. Field of the Invention

The invention relates generally to the field of molding of plastic articles and, more particularly, to a method and apparatus for trimming molded plastic articles, especially with a heat treatment means.

2. Description of the Related Art

Procedures for blow molding double wall plastic articles typically involve the formation of flash or excess material around the perimeter of the part being formed. This flash is pressed thin, or "pinched off" by means of metal to metal contact areas of the opposing mold halves, at the mold parting line and adjacent to the mold cavity or cavities. This pinchoff area is typically relatively wide, on the order of 0.025 to 0.050 inches. When the flash is torn or cut from the molded part, a significant amount of the pinched flash remains attached to said part and must be subsequently removed by mechanical trimming.

In response to the pinchoff problem, a mold construction was developed which is known as "zero land" construction whereby the amount of pinch flash produced is greatly reduced. However, when the flash is removed from the part, the remaining parting line edge is sharp. This sharp edge is unacceptable in some instances. For example, plastic cases manufactured to hold children's toys cannot have sharp edges due to the risk of injury to children.

In both of the above processes, pinchoff and sharp edges have traditionally been removed by hand with a knife. This hand trimming causes several problems, such as the direct increase in labor cost, inconsistent trimming quality and the possibility of repetitive motion syndrome in the wrists of the hand trimmers.

Another approach has been to heat trim the edges of "zero land" molded articles with a hand held propane torch. This method produces acceptably rounded edges of the articles but still involved the above-described problems associated with hand trimming.

It is therefore desirable to trim blow molded plastic articles in a procedure which does not involve substantial additional labor costs, which produces consistent quality trimming, and which does not pose the risk of injury to operators.

It is, therefore, the principal object of the present invention to provide an apparatus for trimming blow molded plastic articles which does not involve a "by hand" procedure.

It is a further object of the present invention to provide an apparatus for trimming such plastic articles which produces consistent quality trimming of sharp edges of plastic molded articles, especially with a heat treatment means.

It a still further object of the present invention to provide an apparatus and method for trimming molded plastic articles which does not involve repetitive hand motions of operators and which, therefore, does not pose the risk of repetitive motion syndrome.

Other objects and advantages will become apparent to those skilled in the art upon a consideration of the following disclosure of the invention.

SUMMARY OF THE INVENTION

The foregoing objects and advantages are obtained by an apparatus for trimming a plastic blow molded article, or workpiece, comprising: means for trimming the workpiece, especially a heat treatment means; holding means for supporting the workpiece, rotatably mounted relative to said trimming means; and cam means for guiding said trimming means, said cam means cooperating said holding means with said trimming means so that said trimming means follows a contour of the workpiece when said holding means is rotated relative to said trimming means. The holding means preferably comprises a turntable.

According to the invention, the cam means preferably comprises a cam disposed on said turntable, said cam being a contoured plate mounted on an axle of the turntable in registry with the workpiece and having a contour selected according to said contour of the workpiece.

Further according to the invention, the trimming means preferably comprises a torch mounted on a carriage, a cam follower mounted on said carriage and disposed in registry with said cam, and means for biasing said carriage toward said cam. The cam follower may preferably comprise an arm mounted on the carriage and having a wheel, rotatably mounted on the arm, said wheel being biased against said cam by said biasing means.

The workpiece is preferably a blow molded plastic case.

BRIEF DESCRIPTION OF THE DRAWINGS

A detailed description of the preferred embodiments of the invention follows, with reference to the accompanying drawings, in which.

DESCRIPTION OF THE PREFERRED EMBODIMENTS

Figure 1:
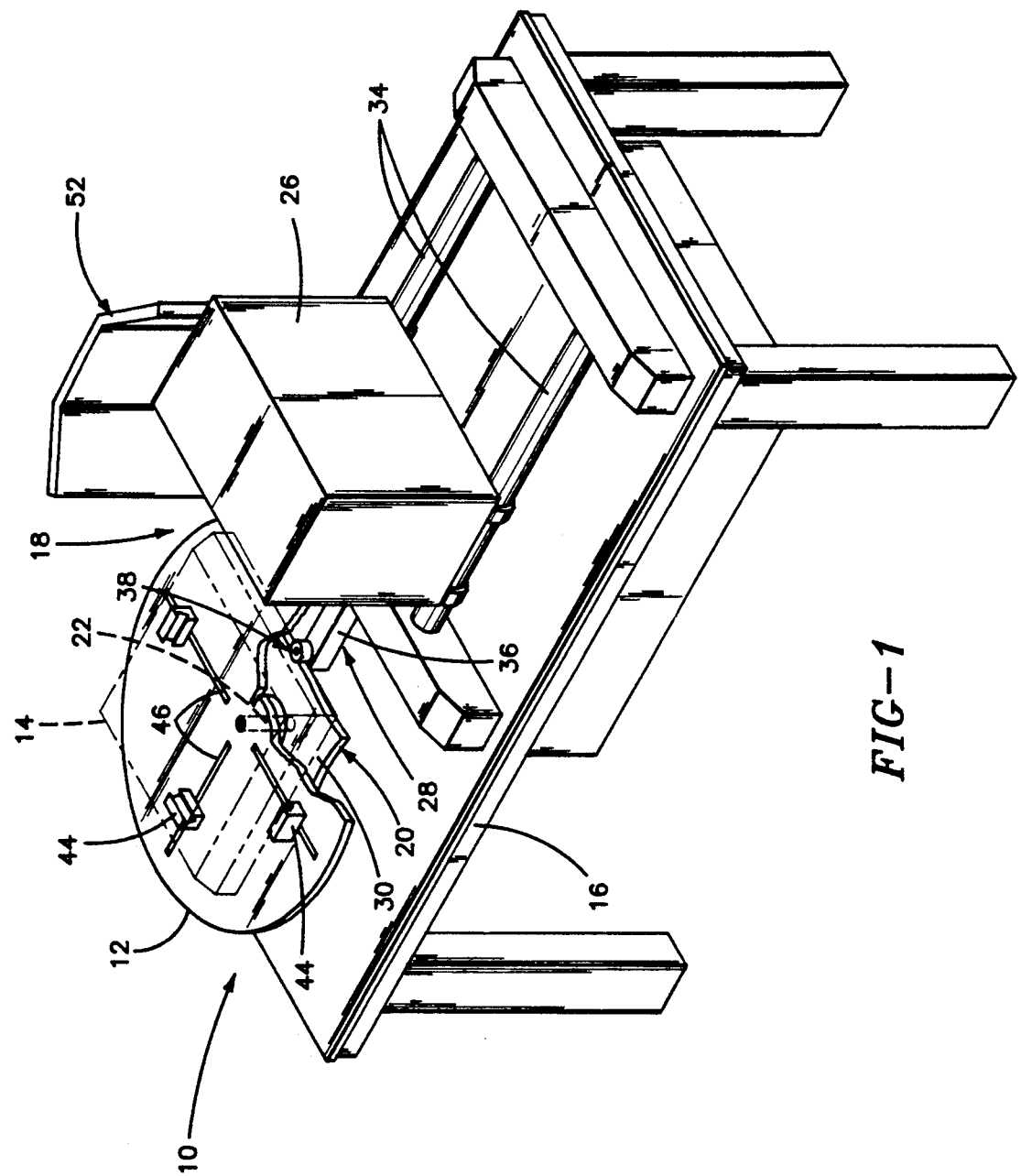
FIG. 1 is a perspective view, partially in section, of an apparatus for trimming articles according to the invention.

Referring now to the drawings, the present invention relates to an apparatus for trimming blow molded plastic articles. Blow molded plastic articles typically have a sharp edge at a portion corresponding to the mold parting line edge. The present invention is directed to a method and apparatus for trimming this sharp edge, especially with a heat treatment means which has been found to be particularly effective.

The present invention is specifically directed to the trimming of blow molded plastic cases. Thus, the following disclosure and drawings illustrate the invention in terms of such plastic cases. Clearly, however, the teachings of the present invention are applicable to the heat trimming of any plastic article having an edge to be trimmed.

FIG. 1 shows a trimming apparatus according to the invention, generally indicated in the drawings as reference numeral 10.

A holding means, such as turntable 12, is provided for positioning a workpiece 14. Turntable 12 is preferably rotatably mounted on a platform 16 A trimming means 18 is disposed on platform 16, in spaced relation to turntable 12 and workpiece 14. Turntable 12 serves to rotate workpiece 14 relative to trimming means 18, so as to trim workpiece 14 as described below.

According to the invention, a cam means 20 is preferably disposed on an axle 22 with turntable 12. Cam means 20 serves to interact with trimming means 18 and provide the proper positioning of trimming means 18 relative to workpiece 14.

Trimming means 18 preferably comprises a torch 24 (best shown in an of FIGS. 2-5) attached to a carriage 26. Torch 24 serves to heat trim the aforesaid sharp edges of workpiece 14 so as to provide a uniform, smooth rounded edge. Carriage 26 is preferably slidably mounted to platform 16 so as to be movable toward and away from turntable 12. Carriage 26 is further preferably biased toward turntable 12 and into engagement with cam means 20. In this manner, cam means 20 controls the position of torch 24 relative to workpiece 14. Carriage 26 may preferably have a cam follower 28 mounted thereto and disposed for interaction or engagement with cam means 20.

Figure 2:
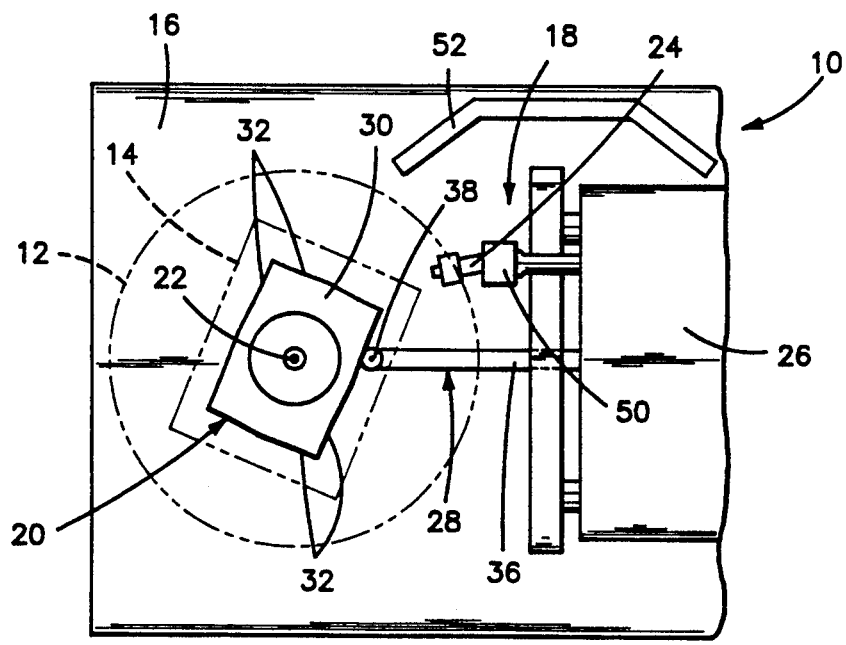
FIG. 2 is a top view of a portion of the apparatus of FIG. 1, according to the invention.

FIG. 2 shows a top view of platform 16, with turntable 12 and workpiece 14 removed (shown in phantom) so as to illustrate the preferable structure and function of cam means 20. Cam means 20 preferably comprises a cam 30 disposed on axle 22 so as to rotate with turntable 12. Cam 30 is preferably a contoured plate, as shown in FIG. 2, having a contour selected according to the contour of workpiece 14. The contour of cam 30 is selected so as to interact with cam follower 28 and provide the proper positioning of carriage 26 relative to rotary turntable 12, and, therefore, the proper positioning of torch 24 relative to a surface of workpiece 14 to be trimmed.

It should be noted that while the preferred embodiment of holding means is turntable 12, which rotates relative to a radially fixed torch 24, the teachings of the present invention could be employed so as to provide a fixed holding means and a torch 24 which rotates around the holding means to provide the relative rotation of the present invention.

As previously mentioned, the workpiece 14 shown in the drawings is a generally rectangular case. Cam 30 therefore has a corresponding shape or contour selected so as to guide cam follower 28, and therefore to guide torch 24 around the contour of a surface of workpiece 14 which is to be trimmed. Cam 30 is therefore preferably mounted in registry with workpiece 14, that is, the sides of cam 30 are generally aligned with the sides of workpiece 14.

The length of cam follower 28 can be adjusted to provide proper spacing of torch 24 relative to workpiece 14. Also, cam 30 may be smaller in size than workpiece 14, the difference in size being compensated by the length of cam follower 28.

As shown in FIG. 2, cam 30 may preferably have sides which are bowed outwardly toward center portions 32 thereof. This bowing of cam 30 helps to compensate for the angle of flame from torch 24. As turntable 12 rotates workpiece 14 relative to torch 24, the flame from torch 24 hits workpiece 14 at an angle near corners of cam 30 and workpiece 14. As the center portions 32 of cam 30 rotate toward torch 24, the flame will become more perpendicular to workpiece 14 and will, therefore, have a greater impact on this portion of workpiece 14. The bowing of the center portions 32 of cam 30 serves to increase the distance between torch 24 and workpiece 14 as the angle of the flame approaches perpendicularity so as to compensate for this greater impact and provide an even trimming of workpiece 14.

Turntable 12 and cam 30 are preferably removably mounted to axle 22 to facilitate changing of cam 30. In this manner, apparatus 10 can be easily adapted to workpieces of different size and shape by changing cam 30 as appropriate. This removable mounting may be achieved by any means known in the art such as, for example, clips, bolts, screws, levers, or the like.

Trimming means 18 may preferably be biased toward turntable 12 through any means known in the art. Such biasing may be achieved, for example, by mounting carriage 26 on rails 34, and biasing carriage 26 with, for example, hydraulic means (not shown).

Figure 3:
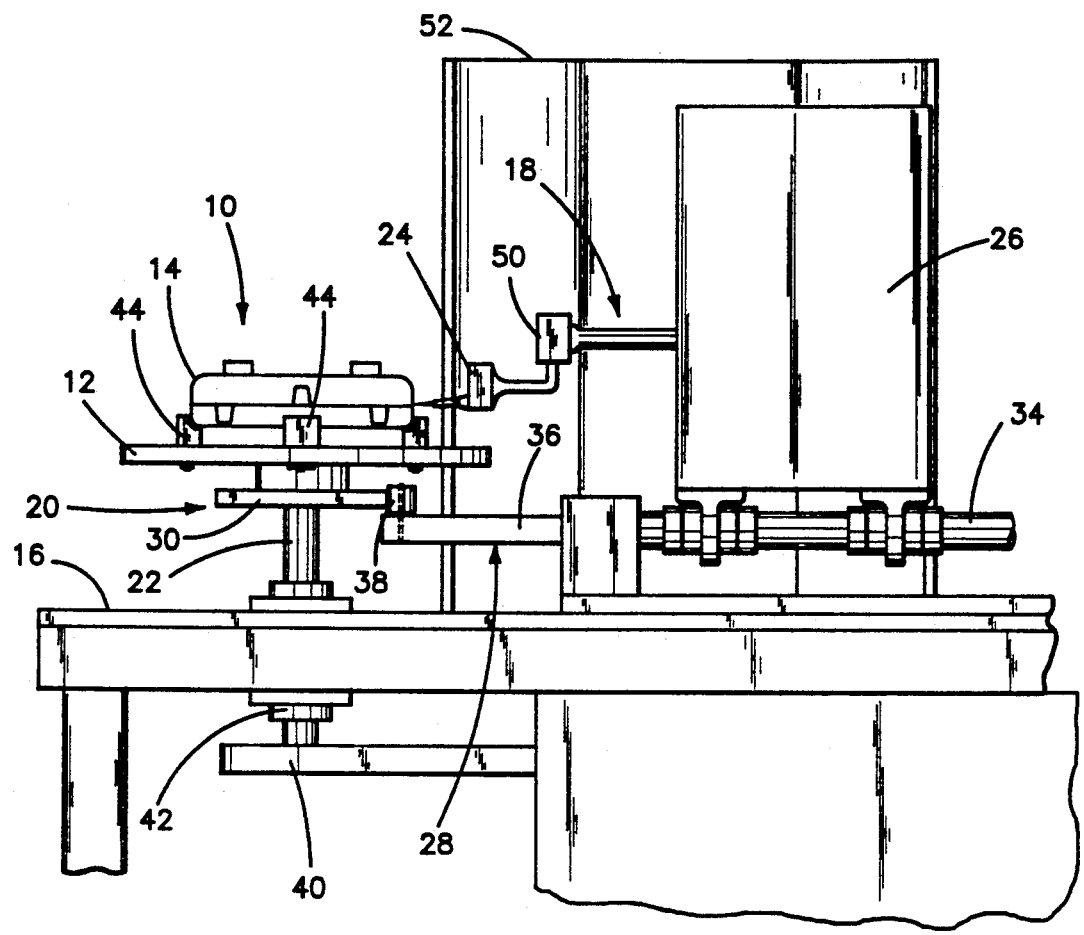
FIG. 3 is a side view of a portion of the apparatus of FIG. 1, according to the invention.

Referring now to FIGS. 2-3, a preferred embodiment of cam follower 28 preferably includes an arm 36, mounted to carriage 26, and a wheel 38, rotatably disposed on arm 36. Biasing of carriage 26 toward turntable 12 causes wheel 38 to contact cam 30. As cam 30 rotates, wheel 38 travels along the contour of cam 30, transmitting the rotation of cam 30 into the desired linear reciprocation of carriage 26.

It should be noted that turntable 12 can suitably be rotated through any means known in the art such as, for example, a belt 40 acting upon a lower end 42 of axle 22 and driven by any conventional motive means (not shown).

Figure 4:
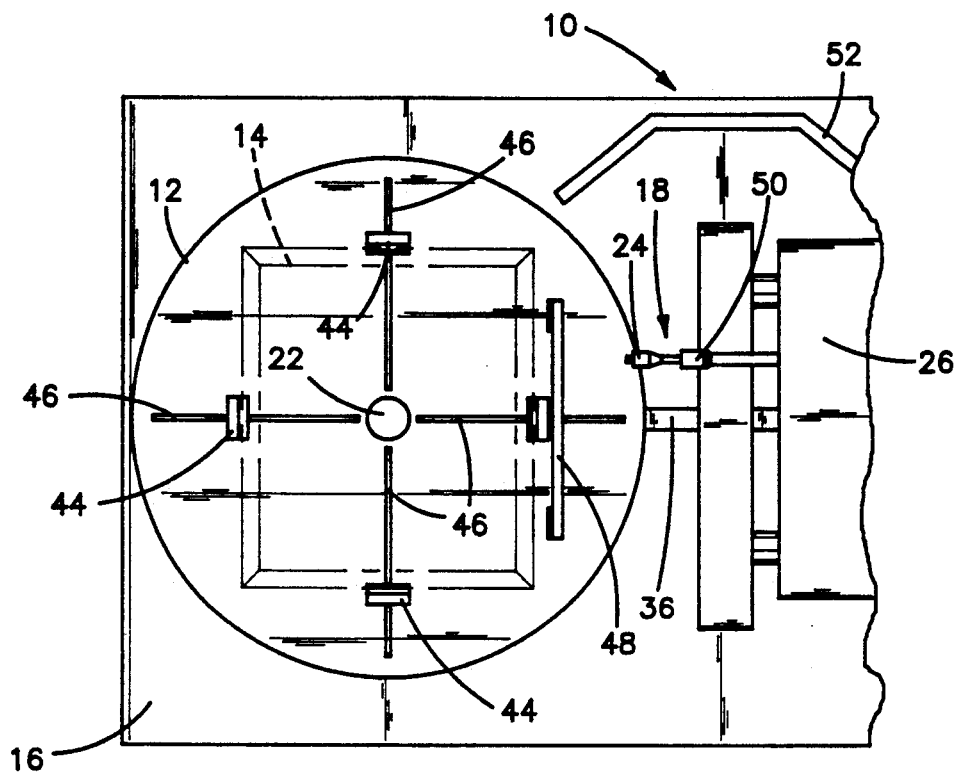
FIG. 4 is a top view of a preferred embodiment of a turntable for use with a trimming apparatus, according to the invention.
Figure 5:
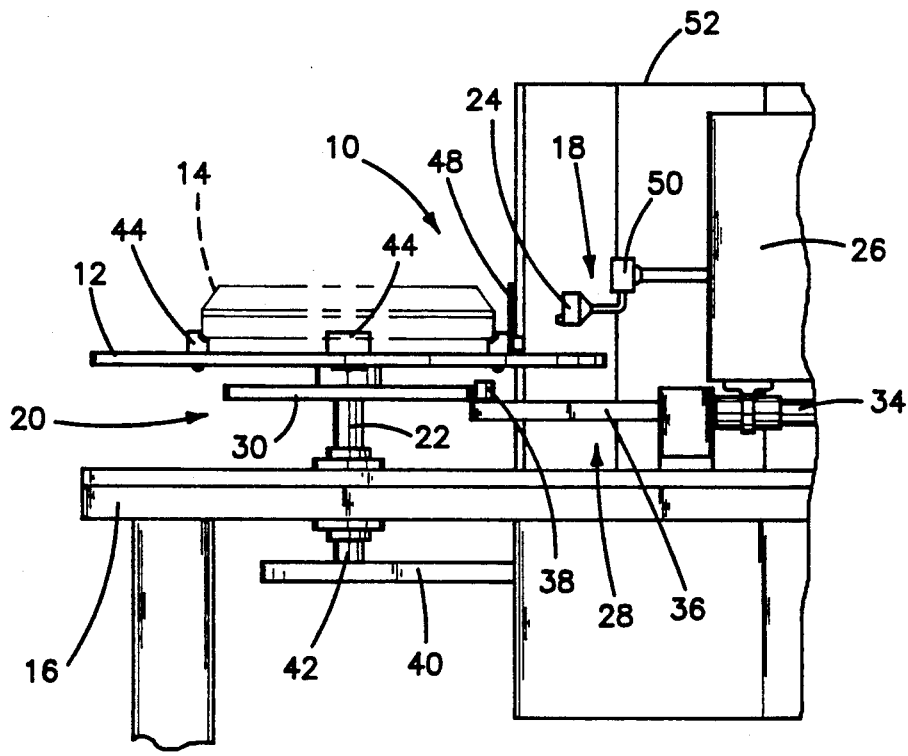
FIG. 5 is a side view of the turntable of FIG. 4.

FIGS. 4 and 5 illustrate a preferred embodiment of turntable 12. As shown, turntable 12 preferably has a plurality of seats 44, preferably mounted in grooves 46 formed in turntable 12. Seats 44 can be positioned in grooves 46 so as to be adjustable for workpieces of different size.

Typical workpieces have hinge or latch portions which cannot be trimmed. Such portions would be damaged or destroyed by the flame from torch 24. According to a preferred embodiment of the invention, these portions are protected by shield means 48 which are adjustably positioned on turntable 12. Shield means 48 may preferably be positioned on one or more seats 44 so as to shield desired portions of workpiece 14 from torch 24. Such shield means 48 may extend along a substantial portion of a side of a workpiece, suitably where the case has a "living hinge" extending along a side, which must be protected. Shield means 48 may also be one or more smaller shield members which could be useful to protect several latches, or the like, on a workpiece.

Referring back to FIG. 2, torch 24 may preferably be pivotally mounted to carriage 26 so that torch 24 can be pivoted into and out of position relative to the workpiece 14. This allows torch 24 to be pivoted away from turntable 12, preferably in a cyclic fashion, based upon the time necessary for completely trimming a workpiece. Such cyclic pivoting means could suitably be any means known in the art for providing timed pivoting of one assembly relative to another, and is shown schematically in FIG. 2 as element 50. The time required for treating a workpiece will be a related to the contour of the workpiece and the speed of rotation of the turntable. In this manner, the operation of apparatus 10 can be further automated.

According to the preferred embodiment wherein torch 24 can be pivoted away from turntable 12, a shield 52 may preferably be disposed along platform 16 in an area through which flame from torch 24 travels when torch 24 is pivoted. Shield 52 serves to protect persons and equipment in the immediate area of the apparatus 10 from incidental damage or injury from torch 24.

According to a still further embodiment of the invention, cam means 20 may comprise a computer generated image of a cam 30, cam follower 28 being guided in position according to the computer generated image. In this embodiment, signals generated by the computer generated cam image would be transmitted to motive means for carriage 26 so as to properly position torch 24 relative to workpiece 14.

With general reference now to FIGS. 1-5, the operation of an apparatus according to the invention will be described.

A workpiece 14 is positioned on turntable 12. Turntable 12 is then set to rotating. After turntable 12 "cues" to a starting position, torch 24 is pivoted into position and flame from torch 24 heat trims the sharp edge of workpiece 14. Torch 24 is biased into position through carriage 26, and follows the contours of workpiece 14 due to cam follower 28 following the contour of cam 30. The rotation speed of the turntable sets a predetermined time which will be necessary to completely trim a workpiece. Torch 24 is preferably set to pivot away from turntable 12 and workpiece 14 upon the expiration of this time. Turntable 12 preferably stops rotating at this point, so that workpiece 14 can be removed and replaced by the next workpiece to be trimmed. Once the next workpiece is in place, the turntable is again started, cues, and brings the torch into position for trimming. This procedure is repeated as desired.

It is clear that the apparatus and method as disclosed provides a trimming of workpieces wherein quality is uniform, labor costs are minimized, and risk of injury to workers is reduced.

This invention may be embodied in other forms or carried out in other ways without departing from the spirit or essential characteristics thereof. The presently described embodiments are therefore to be considered as in all respects illustrative and not restrictive, the scope of the invention being indicated by the appended claims, and all changes which come within the meaning and range of equivalency are intended to be embraced therein.

What is claimed is:

1. Apparatus for trimming sharp edges from a non-round workpiece, comprising:
    flame treatment means for trimming sharp edges from a workpiece by impinging a flame on the workpiece;
    holding means for supporting a contoured, non-round workpiece, said holding means being rotatably mounted relative to said trimming means; and
    cam means for guiding said trimming means comprising a contoured plate having a contour according to the contour of the workpiece, said cam means cooperating said holding means with said trimming means so that said trimming means follows the contour of the workpiece when the holding means is rotated relative to said trimming means.

2. An apparatus according to claim 1, wherein said holding means is a turntable.

3. An apparatus according to claim 2, wherein said cam means includes a cam disposed in fixed spaced relationship to said turntable.

4. An apparatus according to claim 3, wherein said turntable is mounted for rotation on an axle, said cam being mounted on said axle beneath the workpiece.

5. An apparatus according to claim 4, wherein said turntable and said contoured plate are removably mounted to said axle whereby said contoured plate can readily be changed to accommodate workpieces of different contour.

6. An apparatus according to claim 4, wherein surfaces of said contoured plate which correspond to substantially flat surfaces of the workpiece are outwardly bowed to increase the distance between the flame treatment means and workpiece at the outwardly bowed portions.

7. An apparatus according to claim 4, wherein said trimming means comprises a torch mounted on a carriage, a cam follower mounted on said carriage and disposed in registry with said cam, and means for biasing said carriage toward said cam, whereby said cam follower is biased against said contour of said contoured plate.

8. An apparatus according to claim 7, wherein said cam follower comprises an arm mounted on said carriage and having a wheel, rotatably mounted on said arm, said wheel being biased against said contoured plate by said biasing means.

9. An apparatus according to claim 1, wherein the workpiece has portions which are not to be trimmed, the apparatus further comprising shield means disposed on said holding means so as to shield said portions of the workpiece from said trimming means.

10. An apparatus according to claim 1, wherein said trimming means is pivotally mounted to said carriage so that said trimming means can be pivoted away from the workpiece.

11. An apparatus according to claim 10, wherein treatment of each workpiece takes a treatment time, said apparatus further comprising means for cyclically pivoting said trimming means away from the workpiece upon expiration of said treatment time.

12. An apparatus according to claim 1 wherein the holding means is operative to support a workpiece consisting of a blow molded, essentially rectangular plastic case.

13. An apparatus according to claim 12 wherein the cam means is an essentially rectangular plate which essentially follows the contour of the blow molded rectangular plastic case.

14. An apparatus according to claim 1 wherein said holding means is operative to support a contoured workpiece having at least one corner, and wherein said cam means is a contoured plate having at least one corner essentially corresponding to the workpiece.

15. An apparatus according to claim 14 wherein said at least one corner of the contoured workpiece and cam means is an essentially right angled corner.

* * * * *